(12) United States Patent
Castellanos Zamora et al.

(10) Patent No.: US 10,798,753 B2
(45) Date of Patent: Oct. 6, 2020

(54) METHODS AND DEVICES FOR SUPPORTING NETWORK INITIATED PDU SESSION ESTABLISHMENT BETWEEN AN USER EQUIPMENT, UE, AND A DATA NETWORK NAME, DNN, IN A TELECOMMUNICATION NETWORK

(71) Applicant: Telefonaktiebolaget LM Ericsson (publ), Stockholm (SE)

(72) Inventors: David Castellanos Zamora, Madrid (ES); Ralf Keller, Würselen (DE); Cristina Ruiz Balmaseda, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/746,464

(22) PCT Filed: Dec. 21, 2017

(86) PCT No.: PCT/EP2017/083971
§ 371 (c)(1),
(2) Date: Jan. 22, 2018

(87) PCT Pub. No.: WO2019/034271
PCT Pub. Date: Feb. 21, 2019

(65) Prior Publication Data
US 2019/0053295 A1 Feb. 14, 2019

Related U.S. Application Data

(60) Provisional application No. 62/545,069, filed on Aug. 14, 2017.

(51) Int. Cl.
*H04W 76/10* (2018.01)
*H04W 4/029* (2018.01)
*H04W 60/00* (2009.01)

(52) U.S. Cl.
CPC .......... *H04W 76/10* (2018.02); *H04W 4/029* (2018.02); *H04W 60/00* (2013.01)

(58) Field of Classification Search
CPC .................................................. H04W 76/10
See application file for complete search history.

(56) References Cited

U.S. PATENT DOCUMENTS 10,171,682 B1 * 1/2019 Yan .................... H04W 4/70
2017/0303259 A1 * 10/2017 Lee .................... H04W 72/048
(Continued)

OTHER PUBLICATIONS

Unknown, Author, "3rd Generation Partnership Project; Technical Specification Group Core Network and Terminals; Non-Access-Stratum (NAS) protocol for Evolved Packet System (EPS); Stage 3 (Release 14)", 3GPP TS 24.301 V14.4.0, Jun. 2017, pp. 1-486.
(Continued)

*Primary Examiner* — Andrew Lai
*Assistant Examiner* — Andrew C Lee
(74) *Attorney, Agent, or Firm* — Murphy, Bilak & Homiller, PLLC (57) ABSTRACT

A method of initiating a Packet Data Unit, PDU, session between an User Equipment, UE, and a Data Network Name, DNN, in a telecommunication network, said method comprising the steps of; receiving, by an Access & Mobility Function, AMF, a registration request for an UE for registering said UE in said telecommunication network, retrieving, by said AMF, from an Unified Data Management, UDM, node, one or more DNNs to which PDU sessions are expected to be established by said UE in said telecommunication network, and wherein said step of retrieving is triggered by said receiving of said registration request, instructing, by said AMF, said UE to initiate said one or more PDU sessions between said UE and said one or more DNNs. Complementary methods and Devices for perform-
(Continued)

ing a method according to the invention are also presented herein.

15 Claims, 6 Drawing Sheets

(56) References Cited

U.S. PATENT DOCUMENTS

| | | | | |
|---|---|---|---|---|
| 2017/0317894 | A1* | 11/2017 | Dao | H04L 41/5012 |
| 2017/0339609 | A1* | 11/2017 | Youn | H04W 76/11 |
| 2017/0359768 | A1* | 12/2017 | Byun | H04W 8/06 |
| 2018/0199160 | A1* | 7/2018 | Edge | H04W 4/02 |
| 2018/0199240 | A1* | 7/2018 | Dao | H04W 76/10 |
| 2018/0199398 | A1* | 7/2018 | Dao | H04W 36/0022 |
| 2018/0227871 | A1* | 8/2018 | Singh | H04W 60/00 |
| 2018/0324583 | A1* | 11/2018 | Nair | H04W 76/11 |
| 2018/0352483 | A1* | 12/2018 | Youn | H04W 76/18 |
| 2018/0359672 | A1* | 12/2018 | Keller | H04L 67/141 |
| 2019/0044980 | A1* | 2/2019 | Russell | H04W 12/06 |

OTHER PUBLICATIONS

Unknown, Author, "3rd Generation Partnership Project; Technical Specification Group Core Network and Terminals; Policy and Charging Control (PCC); Reference points (Release 14)", 3GPP TS 29.212 V14.4.0, Jun. 2017, pp. 1-277.

Unknown, Author, "3rd Generation Partnership Project; Technical Specification Group Services and System Aspects; Procedures for the 5G System; Stage 2 (Release 15)", 3GPP TS 23.502 V0.5.0, Jul. 2017, pp. 1-153.

Unknown, Author, "3rd Generation Partnership Project; Technical Specification Group Services and System Aspects; System Architecture for the 5G System; Stage 2 (Release 15)", 3GPP TS 23.501 V1.0.0, Jun. 2017, pp. 1-146.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 14)", 3GPP TS 23.401 V14.1.0, Sep. 2016, 1-379.

3GPP, "3rd Generation Partnership Project; Technical Specification Group Services and System Aspects; Procedures for the 5G System; Stage 2 (Release 15)", 3GPP TS 23.502 V2.0.0, Dec. 2017, 1-260.

3GPP, "3rd Generation Partnership Project; Technical Specification Group Services and System Aspects; System Architecture for the 5G System; Stage 2 (Release 15)", 3GPP TS 23.501 V2.0.0, Dec. 2017, 1-183.

* cited by examiner

METHODS AND DEVICES FOR SUPPORTING NETWORK INITIATED PDU SESSION ESTABLISHMENT BETWEEN AN USER EQUIPMENT, UE, AND A DATA NETWORK NAME, DNN, IN A TELECOMMUNICATION NETWORK

TECHNICAL FIELD

The present invention is generally related to the establishment of one or more PDU sessions between an UE and a DNN in a telecommunication network and, more specifically, to a telecommunication network initiated PDU session establishment after the registration of said UE in said telecommunication network.

BACKGROUND

In fourth Generation, 4G/Evolved Packet Core, EPC, systems, User Equipment may attach to a 4G/EPC system to gain connectivity towards Packet Data Networks, PDNs, where a PDN connection is defined as the association between an UE which is, for example, represented by an Internet Protocol, IP, address, and a PDN represented by an Access Point Name, APN.

An APN is a label according to Domain Name System, DNS, naming conventions describing the access point to the packet data network. The list of authorized/subscribed APNs for a given user together with the characteristics of the PDN connections each APN represent in terms of e.g. IP vs non-IP type, default Quality of Server, QoS, etc., is stored in the Home Subscriber Server, HSS, as part of the subscription information for each user.

The subscription profile information may contain at least the configuration for a default APN. There may be at most two default APNs for a given user, i.e. one default APN for PDN types of "IP" type and another default APN can belong to PDN type of "Non-IP".

Up to 3GPP Rel-15, during the Attach procedure the UE shall include a PDN connectivity request procedure and the EPC shall establish a PDN connection for the default APN when no APN is provided by the UE. An UE connected to the Long Term Evolution, LIE, the EPC shall have at least one active PDN connection, otherwise the LTE/EPC will detach the UE from the system.

A Voice over LTE UE, based on IR.92, supports the use of an APN during the attach procedure and also to rely on the default APN for the first PDN connection to be established.

In 3GPP Rel-15, a feature allowing "Attach without PDN Connectivity" has been introduced where an UE may be connected to the LTE/EPC system without any active PDN connection. This feature is controlled by an additional "PDN-Connection-Restricted" flag, which when set, and if the MME and the UE supports Attach without PDN connection, indicates the Mobility Management Entity, MME, that it shall not establish any non-emergency PDN connection for the user.

The possibility for an UE to attach to a fifth generation, 5G System, telecommunication network without an active PDN connection has been made the baseline mode of operation in 5GS except for the fact that the concepts of PDN, PDN Connection and APN have been renamed to Data Network, DN, Packet Data Unit, PDU, Session and Data Network Name, DNN respectively.

Furthermore, according to current versions of 3GPP TS 23.501 and 23.502, PDU sessions can only be established upon UE request. At most, upon request from an Application Server, the 5GS is able to trigger a specific application in the UE and when receiving that trigger message, the UE shall pass it to the identified application in the UE where the identified application in the UE may establish a PDU Session to a specific DNN.

Currently there is no mechanism defined in 3GPP for the 5GS itself to trigger the UE to establish a PDU session with the 5GS. In other words, it is currently not possible to have the same behaviour with 5GS as with LTE/EPC in relation to the handling of default APN/DNN. In case the user subscription marks the IP Multimedia Subsystem, IMS, APN/DNN as default APN, the 5GS will not trigger the establishment of the DNN during registration in 5GS.

The existing mechanisms for PDU session establishment are either UE initiated or network initiated after invocation of an Application Server external to the 5GS, and even in this network initiated method the actual PDU session is established by the UE. The currently defined network initiated PDU session establishment procedure by 3GPP is suitable as a device trigger mechanism for Internet of Things, IoT, devices and for which this mechanism requests the UE to establish of a PDU sessions triggered by the IoT application platform. This device trigger request is completed by sending a Short Message Service, SMS, to the UE including the needed information for the UE, i.e. the 5GS is required to support SMS.

However for certain services, such as the IP Multimedia Subsystem, IMS, voice service the network initiated PDU session establishment procedure defined in 3GPP is not suitable. These devices are expected to be connected running the PDU session towards the IMS at all times. In the absence of the support for the 5GS to establish a default DNN similarly as in LTE/EPC the PDU session establishment process is delegated to the UE in this case. An appropriate UE configuration is therefore advantageous for proper service delivery and user experience.

SUMMARY

It is an object to provide methods for supporting network initiated PDU session establishment between an User Equipment, UE, and a Data Network Name, DNN, in a telecommunication network.

It is another object to provide for devices supporting the network initiated PDU session establishment between an UE and a DNN in a telecommunication network.

In a first aspect, there is provided, a method of initiating a Packet Data Unit, PDU, session between an User Equipment, UE, and a Data Network Name, DNN, in a telecommunication network The method comprising the steps of receiving, by an Access & Mobility Function, AMF, a registration request for an UE for registering said UE in said telecommunication network, retrieving, by said AMF, from a Unified Data Management, UDM, node, one or more DNNs to which PDU sessions are to be expected to be established by said UE in said telecommunication network, wherein said step of retrieving is triggered by said receiving of said registration request, instructing, by said AMF, said UE to initiate said one or more PDU sessions between said UE and said one or more DNNs.

According to the presented method, the telecommunication network, for example the AMF, initiates the PDU session establishment. That is, the telecommunication network provides information to the UE, triggered by the registration procedure, about the PDU sessions that the telecommunication network expects the UE to establish upon completion of the registration procedure.

One of the advantages hereof is that the telecommunication network does not need to rely on proper UE configuration. The telecommunication network decides itself which PDU sessions are to be established, and which DNN's are to be used for the PDU sessions.

The presented method is advantageous for Mobile Network Operator, MNO, services such as IMS voice service, where the establishment of the corresponding PDU sessions can be instructed to the UE based on, for example, subscription information in the UDM. This is advantageous as in such a case the telecommunication network may assure that a PDU session is available for the UE which may be required for these types of services e.g. IMS voice service needs a PDU session to contact the UE in a calling case scenario towards the UE.

In accordance with the present disclosure, the AMF may provide for the following services: Termination of Radio Access network, RAN, Control Plane, CP, interface, Termination of Non-Access Stratum, NAS, NAS ciphering and integrity protection, Registration management, Connection management, Reachability management, Mobility Management, Lawful intercept, Provide transport for messages between UE and Session Management Function, SMF, Transparent proxy for routing Session Management messages, Access Authentication and Authorization, Provide transport for SMS messages between UE and SMS function, SMSF, Security Anchor Function, SEA, Security Context Management, SCM, etc. Many of these denoted in general as Network Function, NF.

In accordance with the present disclosure, the UDM node may comprise two parts, i.e. an application frond end, FE, and an User Data Repository, UDR. The UDR may store data required for functionalities provided by the UDM-FE, plus policy profiles required by Policy Function, PCF. The data stored in the UDR may include User subscription data, including subscription identifiers, security credentials, access and mobility related subscription data and session related subscription data as well as Policy data.

The instruction that is sent to the UE that one or more PDU sessions are to be established is triggered by the event that the UE is registered in the telecommunication network. This improves the likelihood that a PDU session is available for the UE during its connection to the telecommunication network.

In an example, the one or more DNNs to which PDU sessions are established by the UE are provided by the AMF to the UE after completion of registration of the UE in the telecommunication network. Furthermore, in the step of retrieving, by said AMF, from said UDM node, additional information may be retrieved. The additional information may include the subscription information of the UE, and an indication of whether the UE is expected to establish PDU connections towards any of the authorized DNNs.

In an example, the method further comprises the steps of:
determining, by said AMF, that a further PDU session is to be established to a further DNN based on dynamic conditions, wherein said dynamic conditions comprise any of UE context information and policies;
instructing, by said AMF, said UE to initiate said further PDU session between id UE and said further DNN.

This particular example describes a situation in which the AMF receives one or more DNNs to which PDU sessions are to be expected to be established, but the AMF actually overrules that decision. That is, the AMF decides that at least one of the one or more DNNs are not to be established upon registration of the UE in the telecommunication network.

The decision, i.e. the overruling, of the AMF may be based on UE contact information received from the UE during the registration process, i.e. whether the UE indicates support for certain services like voice centric UE or anything alike. It may also be based on dynamic conditions locally configured in the AMF in relation to, for example, UE location, time, etc. It may further be based on dynamic conditions on a per UE basis managed in the policy function PCF.

The AMF may monitor the UE contact information, the dynamic conditions or anything alike, and may decide that, upon any observed changes, to instruct the UE to actually initiate a further PDU session between the UE and a further DNN. The above may thus not take place during registration of the UE in the telecommunication network, but may be initiated upon changes detected in the UE contact information, dynamic conditions or anything alike.

Therefore, further DNNs with which further PDU sessions are to be established are among the one or more DNNs which the AMF has retrieved from the UDM, but the AMF has not yet instructed the UE to establish PDU sessions with the further DNNs at the time of registration of the UE in the telecommunication network.

In a further example, the step of retrieving comprises:
transmitting, by said AMF, an update location request message for informing said UDM about an updated location of said UE;
receiving, from said UE, an update location response message, wherein said update location response message comprises said one or more DNNs to which PDU sessions are to be expected to be established.

It was found that already existing messages may be used for conveying the one or more DNNs to which PDU sessions are expected to be established. In the described telecommunication network, the AMF contacts the UDM to request subscriber data of the UE. The return message, i.e. the update location response message, is used for conveying the subscriber data but may also be used for conveying a list of DNNs as well as an indication for which of those DNNs a PDU connection is to be established. As the naming of signals has not yet been made uniform, it is possible that the update location request message and the update location response messages are referred to by other names. For example, the registration request message may be UE context management registration request, Nudm_UEContext-Management_register request, the update location request may be replaced by a subscriber data get, Nudm_SubscriptionDataManagement_Get, request message and the response containing the DNNs may be a Nudm_SubscriptionDataManagement_Get, respons message. It is noted that the outcome, being that the AMF transmits a message to the UDM indicating an updated location of the UE and/or requesting information regarding the subscriber information and subsequently receives said requested information including the DNNs, is more relevant than the name of the signal itself.

In a further example, said step of instructing said UE to initiate said one or more PDU sessions is conveyed using NAS signalling.

In another example, the step of instructing said UE to initiate said one or more PDU sessions comprises PDU session type information for indicating to said UE which type of PDU sessions to be established.

The advantage of this example is that the UE is immediately aware which type of PDU session is to be established.

The type of PDU session can be, for example, Internet Protocol, IP, Ethernet or unstructured.

In a further example, the method comprises the steps of;
 determining, by said AMF, that PDU sessions need to be established only for a subset of received DNNs;
 instructing, by said AMF, said UE to establish PDU sessions with DNNs in said subset of received DNNs.

Here, it may be decided, by the AMF, that not all PDU sessions need to be established upon registration of the UE in the telecommunication network. As such, the AMF may decide that only a subset of the one or more DNNs are to be used for establishing PDU sessions. This reduces overhead in the telecommunication network.

In a second aspect, the present disclosure provides in a method of initiating a PDU session between an User Equipment, UE, and a Data Network Name, DNN, in a telecommunication network
The method comprising the steps of:
 sending, by said UE, to an Access and Mobility Function, AMF, a registration request for registering said UE in said telecommunication network;
 receiving, by said UE, from said AMF, an indication of completion of registration and a list of one or more DNNs with which a Packet Data Unit, PDU, session is to be established;
 initiating, by said UE, the establishment of one or more PDU sessions with said one or more DNNs.

The expressions, i.e. the wording, of the different aspects comprised by the method and devices according to the present disclosure should not be taken literally. The wording of the aspects is merely chosen to accurately express the rationale behind the actual functioning of the aspects.

In accordance with the present disclosure, different aspects applicable to the above mentioned examples of the methods, including the advantages thereof, correspond to the aspects which are applicable to the network, the base station as well as the User Equipment.

The advantage of the method in accordance with the second aspect is that the UE is made aware of the PDU sessions that are expected to be established. No additional signalling is required, the DNNs are provided to the UE in the registration complete message. The registration complete message is a known, already existing, message for indicating to the UE that the UE has successfully registered in the telecommunication network. That particular message may be extended with a new information element, wherein that particular information element is used for conveying the list of DNNs to which the UE should set up PDU sessions.

In a third aspect, there is provided a method of providing one or more Data Network Names, DNNs, by a Unified Data Management, UDM, in a telecommunication network, said method comprising the steps of:
 receiving, by said UDM, a registration request from an Access and Mobility Function, AMF, for registering an User Equipment, UE in said telecommunication network;
 registering, by said UDM, an AMF address associated with said AMF for said UE, allowing network functions to contact the UE via said AMF
 receiving, by said UDM, an Update location request from said AMF;
 sending, by said UDM, to said AMF an update location response, wherein said update location response comprises subscription data and one or more DNNs to which Packet Data Unit, PDU, sessions are to be established by said UE.

As mentioned earlier, the UDM may receive a subscriber data get message or any other corresponding message from the AMF instead of receiving the update location request. Accordingly, the response message provided by the UDM may also be different.

In a fourth aspect, there is provided an Access and Mobility Function node, AMF, arranged for initiating a PDU session between an User Equipment, UE, and a Data Network Name, DNN, in a telecommunication network, said AMF comprising:
 receive equipment arranged for receiving a registration request from said UE for registering said UE in said telecommunication network;
 retrieve equipment arranged for retrieving from a Unified Data Management, UDM, node, one or more DNNs to which Packet Data Unit, PDU, sessions are expected to be established by said UE in said telecommunication network, wherein said retrieve equipment is activated upon receiving said registration request by said receive equipment;
 instruct equipment arranged for instructing said UE to initiate said one or more PDU sessions between said UE and said one or more DNNs.

In an example, the AMF further comprises:
 determine equipment arranged for determining that a further PDU session is to be established to a further DNN based on dynamic conditions, wherein said dynamic conditions comprise any of UE context information and policies.

In a further example, the retrieve equipment further comprises:
 transmit equipment for transmitting an update location request message for informing said UDM about an updated location of said UE;
 receive equipment for receiving an update location response message, wherein said update location response message comprises said one or more DNNs to which PDU sessions are to be expected to be established.

In another example, the AMF further comprises:
 determine equipment for determining that PDU sessions need to be established only for a subset of received DNNs.

In a fifth aspect, there is provided an User Equipment, UE, arranged for initiating a PDU session between said UE and a DNN, based on a received list of DNN, said UE comprising:
 registration module for transmitting a registration request in a telecommunication network to an Access and Mobility Function, AMF;
 receive module for receiving from said AMF a list of DNNs with which the UE is expected to establish a Packet Data Unit, PDU, session;
 PDU initiation module for initiating PDU sessions between said UE and one or more DNNs contained in said list of DNNs.

In a sixth aspect, there is provided a computer program product, comprising a readable storage medium, comprising instructions which, when executed on at least one processor, cause the at least one processor to carry out the method according to any of the method claims as provided above.

The above-mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
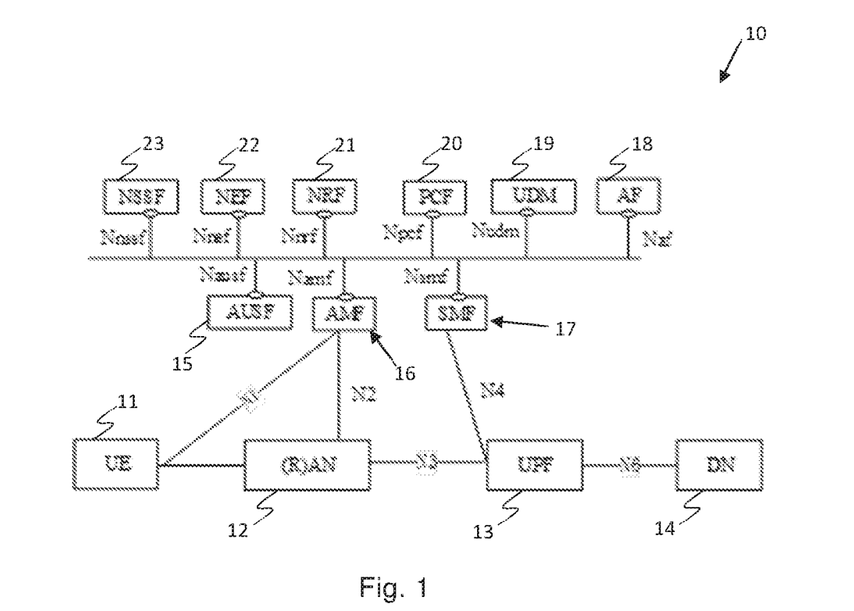
FIG. 1 is a schematic chart illustrating the architecture of a 5GS telecommunication network.

In FIG. 1, reference number 10 indicates a reference architecture for a 5G System. The 5G System architecture comprises the following network functions, NF's:
  Authentication Server Function, AUSF, 15
  Core Access and Mobility Management Function, AMF, 16
  Data network, DN, e.g. operator services, Internet access or 3rd party services, 14
  Structured Data Storage network function, SDSF, not shown in figure
  Unstructured Data Storage network function, UDSF, not shown in figure
  Network Exposure Function, NEF, 22
  NF Repository Function, NRF, 21
  Network Slice Selection Function, NSSF, 23
  Policy Control function, PCF, 20
  Session Management Function, SMF, 17
  Unified Data Management, UDM, 19
  Unified Data Repository, UDR, not shown in figure
  User plane Function, UPF, 13
  Application Function, AF, 18
  User Equipment, UE, 11
  (Radio) Access Network ((R)AN), 12

The functional description of these network functions is specified in clause 6 of the 3GPP standard 23.501, "System Architecture for the 5G system", the contents of which are included herein, by reference. Specifically, in FIG. 1, reference number 10 indicates the system architecture for a 5GS telecommunication network in a non-roaming case. That is, the UE 11 is in the telecommunication network where it is originally belongs to, i.e. registered. In other words, the UE 11 is in the home telecommunication network.

Figure 2:
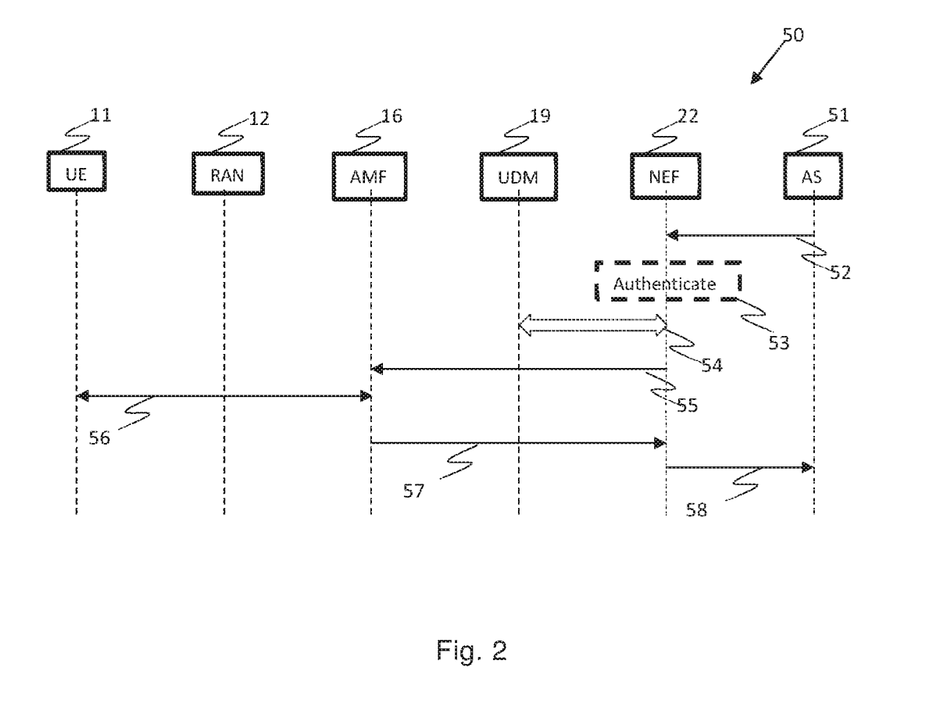
FIG. 2 is a schematic chart showing the initiation of a DNN session in a system according to the prior art.

FIG. 2 is a schematic chart showing the initiation of a Data Network Name, DNN, session in a system according to the prior art. Specifically reference number 50 indicates a signalling diagram highlighting the sequence of events and signalling occurring to setup a Packet Data Unit, PDU, session between an UE 11 and an Application Server, AS, in a Data Network, DN, identified with a Data Network Name, DNN. The Application server 51 sends a device trigger request 52 to the Network Exposure Function, NEF, 22. The NEF then proceeds to authenticate 53 the UE 11 and to ensure that the UE 11 is authorized to receive data in said telecommunication network. Once the authentication and authorization 53 has been performed, the NEF retrieves information 54 regarding the subscriber serving NF services from the UDM 19. The retrieval often comprises requesting the information to the UDM 19 and receiving the requested information from the UDM 19.

Upon identification of the NFs, the NEF 22 sends a device trigger request 55 to the corresponding AMF 16 of the identified NFs. When the AMF 16 receives a device trigger request 55, it forwards the request 56 to the corresponding UE 11 and receives a device trigger response 56. The received device trigger response 56 is subsequently forwarded to the UDM 19 and then back to the Application server 51 in instances 57, 58 respectively. From the signalling diagram it is clear that the initial trigger request is generated by the application server which is in turn generated by a specific application with the UE (not shown in figure). Furthermore, in a system operating according to signalling diagram 50, the network does not provide any information regarding which DNN, or APN, the UE 11 should connect to. As a result, the UE 11 establishes connection with a default DNN or no connection at all.

Figure 3:
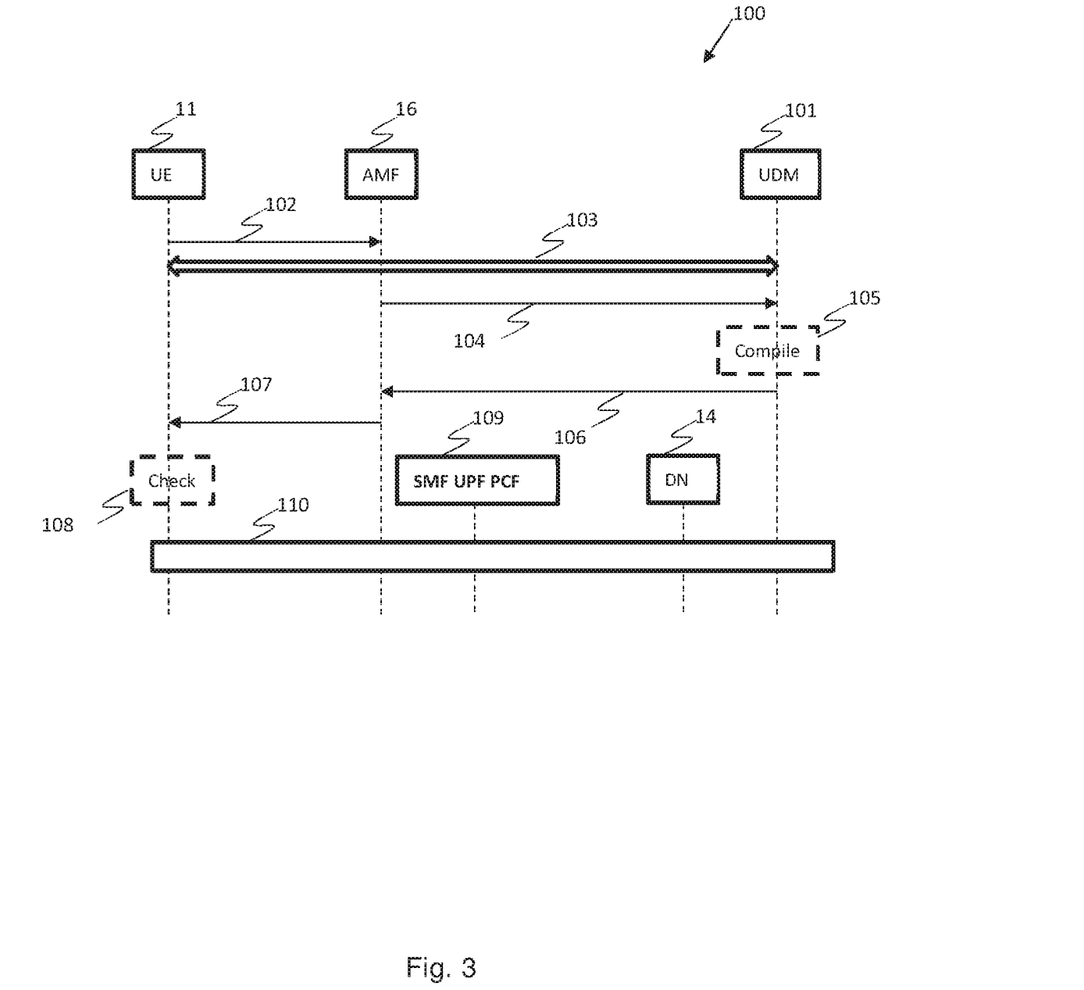
FIG. 3 is a schematic chart showing an implementation of the method according to the present invention.

In FIG. 3 a schematic chart 100 shows an implementation of the method according to the present invention. When an UE 11 is to be registered in a telecommunication network, the UE 11 sends a registration request 102 to the AMF 16. Subsequently, the UE 16 is authenticated in the telecommunication network by the AUSF whereby the 5GS authenticates 103 the UE 11. Once the UE 11 is authenticated by the 5GS, the AMF requests to be registered 104 in the UDM and requests for subscription data 104 relating to the particular UE 11, Upon receiving the registration request 104 from the AMF 16, the UDM 101 registers the AMF 16 address for the UE 16, as the AMF network functions shall use to contact the UE. Furthermore, the UDM compiles the subscription data 105 including a list of DNNs which are to be established by the UE 11. According to the present invention, the DNN configuration for each DNN includes an indication of whether the UE 11 is expected to establish a PDU connection towards that particular DNN. More than one DNN could have such indication. Also, as an alternative scenario, none of the authorized DNNs for an UE may include the indication. It is noted here that the default APN defined in a 4G subscription could be considered implicitly as to be requested to the UE under 5GS in the procedure as defined in the present disclosure.

After compiling the subscription data and the list of DNNs 105, this information is provided 106 to the AMF 16. The AMF 16 then sends a registration complete message 107 together with the list of DNNs that the 5GS network expects the UE 11 to establish connections to. The UE 11, upon receiving the registration confirmation 107, checks 108 if the AMF 16 has included DNNs for which it requests to establishment of one or more PDU sessions. In case the UE determines that the AMF 16 has requested the establishment of one or more PDU sessions, the UE 11 initiates the establishment 110 of the requested PDU sessions using existing procedures including interactions within the 5GS between AMF 16, SMF, PCF and UPF 109, and UDM 101. If more than one PDU session is requested to be established in the registration confirmation 107, then the UE 11 establishes the PDU session to a first DNN and then The PDU session to a second DNN and so on. Furthermore, the AMF 16 may specify that all requested DNNs are established and may reseed the indication to establish remaining PDU sessions in subsequent NAS signalling communications towards the UE 11. The registration complete message 107 which is sent by the AMF 16 to the UE 11, may also contain additional elements such as:

the PDU session type: if a PDU session type is not mentioned, the UE 11 uses a preconfigured PDU session type such as IP type, Ethernet, unstructured etc.
other information required to successfully establish a PDU session.

Figure 4:
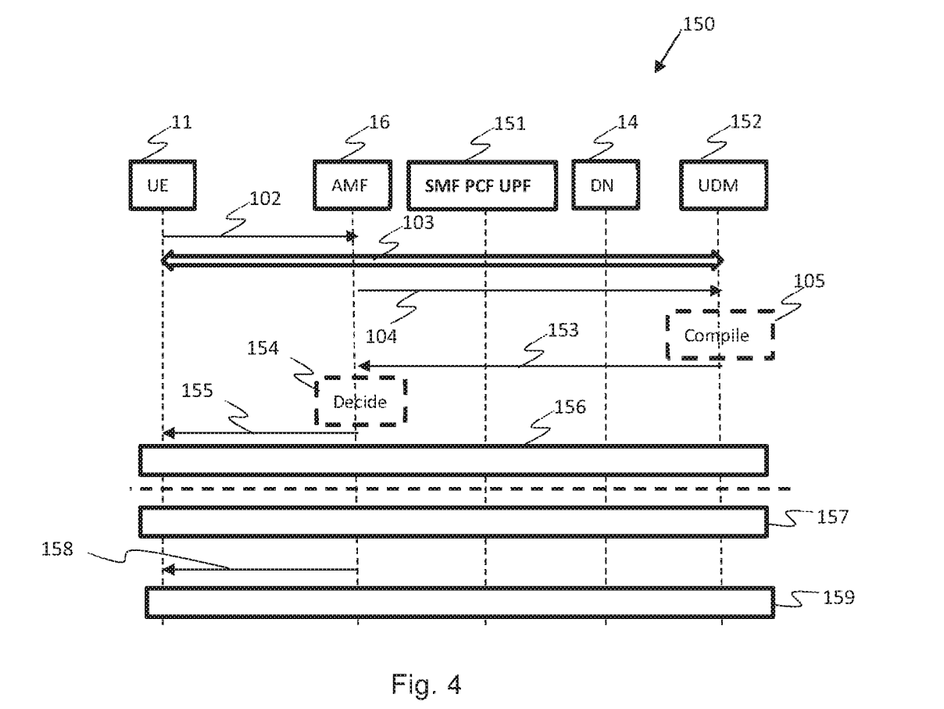
FIG. 4 is a schematic chart showing an implementation of the method according to the present invention.

FIG. 4 shows a schematic chart 150 showing an implementation of the method according to the present invention. According to the embodiment shown in chart 150, the first steps 102-105 are the same as explained earlier. After compiling the subscription data and the list of DNNs which are to be established by the UE, the UDM 152 provides an update location response 153 to the AMF 16 which contains the list of DNNs to which the UE 11 is expected to establish a PDU session. In an exemplary case, the list comprises of one DNN namely DNN1 for DN 14 with which the UE is expected to establish a PDU session using AMF 16, SMF, PCF, UPF 151. After receiving the subscription information from the UDM 152 in step 153, the AMF 16 may decide 154 whether to request the UE 11 to establish the PDU connection towards DNN1. When deciding 154, the AMF 16 may consider several factors such as:

UE context information received from the UE 11 during the registration process, i.e. whether the UE indicates support for certain services such as voice over LTE
Dynamic conditions locally configured in the AMF 16 in relation to the UE location, time etc.
Dynamic conditions on a per UE basis managed in the policy function PCF.

The AMF 16 may also consider any other relevant conditions while deciding whether or not to instruct the UE 11 to establish the PDU session between the UE 11 and DNN1. If the AMF determines that the PDU session towards DNN 1 is to be established, the system proceeds as discussed earlier in relation embodiment 100 in FIG. 2. If however, it is determined based on the above mentioned, or any other factor, that the PDU session should not be established, the AMF sends only the registration confirmation 155 and the PDU session is not established 156 by the UE 11. It may be possible that the UE 11 still attempts to establish the PDU session for DNN1 based on local configuration, but the request may then be rejected by the 5GS based on the same conditions mentioned above.

If at a later point in time, any of these conditions changes 157 while the UE is connected to the 5GS, the AMF could take advantage of any further communication with the UE to request the establishment 158 of the PDU connection to DNN1 at that subsequent stage. The UE 11 then proceeds to establish 159 the PDU session to DNN1.

Figure 5:
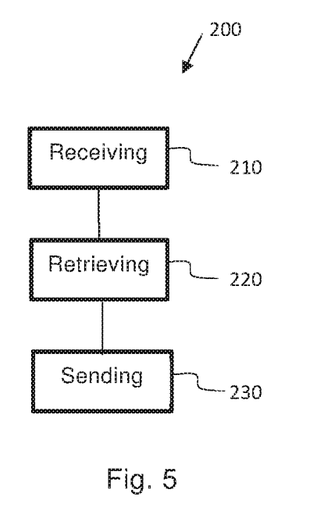
FIG. 5 is a schematic chart illustrating the basic steps involved in the method according to the present disclosure.

FIG. 5 shows a schematic chart 200 illustrating the basic steps involved in the method according to the present disclosure. The reference number 200 indicates a method according to the present invention, being performed by the AMF node. In a first step of receiving 210, the AMF receives a request from UE to be registered in a telecommunication network. Upon receiving the request, in a subsequent step 220, the AMF retrieves one or more DNNs from a UDM, wherein the retrieved DNNs are the ones to which the UE is expected to establish a PDU session. The step of retrieving, 220 comprises sending an update location request by the AMF to the UDM and consequently receiving a update location response from the UDM. The received update location response comprises of the subscription data and a DNN list. The DNN list is a list of DNNs with which the UE is expected to establish a PDU session.

In a final step 230, the AMF sends a registration complete message to the UE along with the list of received DNNs in step 220. Therefore, in step 230, the AMF provides the UE with the list of DNNs with which it is expected to establish a PDU session. In an embodiment, the instruction to initiate a PDU session is conveyed using NAS signalling. Furthermore, it may be advantageous to include additional information regarding the session type information for indicating to the UE which type of PDU session is to be established. The different types of PDU session types may be, for example, IP type, Ethernet, unstructured etc.

Figure 6:
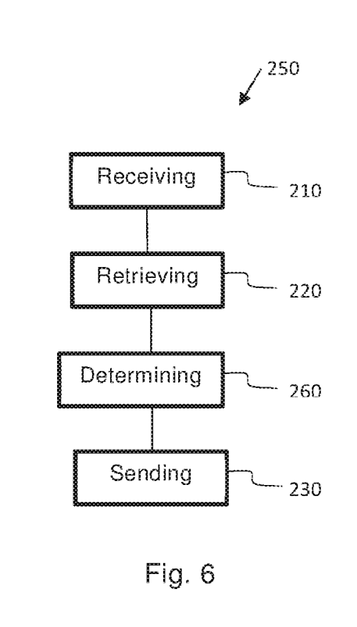
FIG. 6 is a schematic chart illustrating the basic steps involved in the method according to the present disclosure.

FIG. 6 shows a schematic chart 250 illustrating the basic steps involved in the method according to the present disclosure. The method illustrated in this figure is similar to the method illustrated in FIG. 5 expect for the additional step of determining, 260. In a step of determining, 260, the AMF determines whether PDU sessions need to be established by the UE for all of the DNNs contained in the list of received DNN in step 220. As a result of determining, 260, the AMF determines that PDU sessions need to be established only for a subset of the available DNNs. Once the AMF has selected a subset of DNNs, the AMF in step 230 instructs the UE to setup PDU sessions with the selected subset of DNNs. In step 260, the AMF may take a decision of selecting a subset of DNNs based upon any of:

UE context information received from the UE during the registration process, Such context information, could be for example, whether the UE indicates support for certain services such as Voice over LTE
Dynamic conditions locally configured in the AMF in relation to the UE location or time
Dynamic conditions on a per UE basis managed in the policy function PCF.

Figure 7:
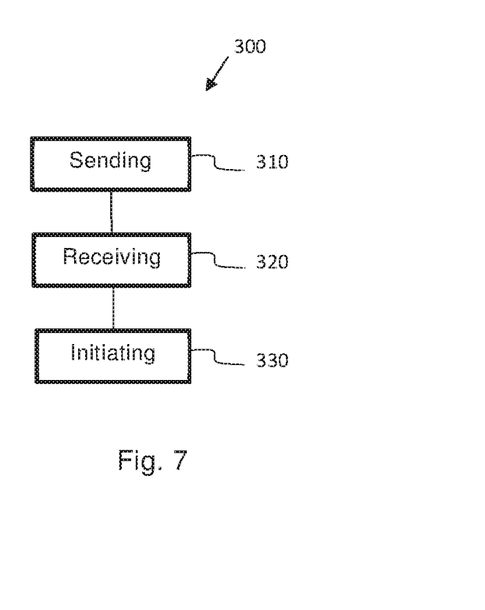
FIG. 7 is a schematic chart illustrating the basic steps involved in the method according to the present disclosure.

FIG. 7 shows a schematic chart 300 illustrating the basic steps involved in the method according to the present disclosure. The reference number 300 indicates a method according to the present invention, being performed by the User Equipment, UE, in a telecommunication network. In a first step of sending, 310, the UE sends a registration request to the AMF to be registered in the telecommunication network. The registration request sent by the UE triggers the AMF to retrieve a list of DNNs with which the UE is expected to establish a PDU session. Once the registration request is sent, the UE then receives, in step 320, a registration confirmation together with a list of one or more DNNs with which the UE has to establish a PDU session. The list is provided to the UE by the AMF. After receiving the list of one or more DNNs, the UE proceeds to, in step 330, initiate the establishment of PDU sessions towards said one or more DNNs.

It may be possible that the AMF decides that no PDU sessions are to be initiated at the instant of registration. In such a scenario, the UE only receives a registration confirmation from the AMF. The AMF may at a later stage determine, subject to a change in dynamic conditions, that the UE can initiate PDU sessions towards one or more DNNs. At such instant, the UE receives further signalling from the AMF indicating to set up the PDU sessions with the corresponding DNNs. The UE then proceeds to initiate, 330, the PDU sessions with the corresponding DNNs.

Figure 8:
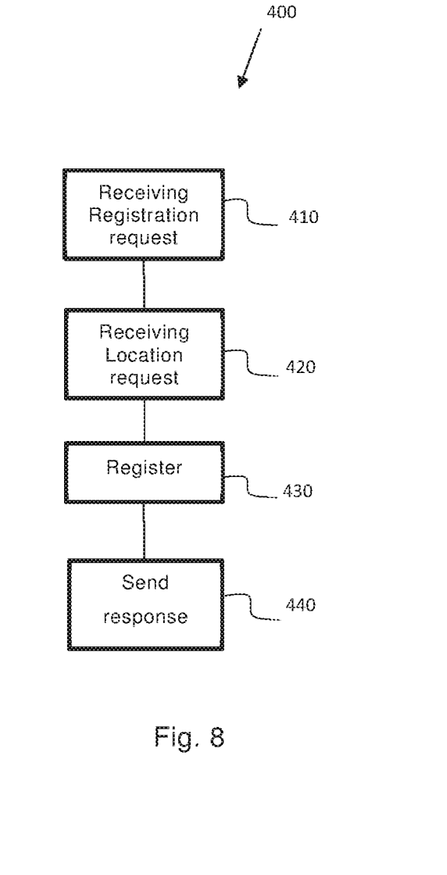
FIG. 8 is a schematic chart illustrating the basic steps involved in the method according to the present disclosure.

FIG. 8 shows a schematic chart, 400, illustrating the basic steps involved in the method according to the present disclosure. The reference number 400 indicates a method according to the present invention, being performed by Unified Data Management, UDM, in a telecommunication network. In a first step of receiving, 410, the UDM receives a registration request from the UE for being registered in the telecommunication network. In step 420, the UDM receives an update location request from an AMF in the telecommunication network. The UDM, in step 430 proceeds to register the UE in the telecommunications network. The UDM also registers an AMF address associated with the AMF. In a final step, 440, the UDM sends an update location response back to the AME. The update location response also comprises subscription data pertaining to the UE and also a list of one or more DNNs to which PDU sessions are to be established by the UE. While sending the list of one or more DNNs, the default APN, as defined in a 4G subscription, could be considered to be implicitly included.

Figure 9:
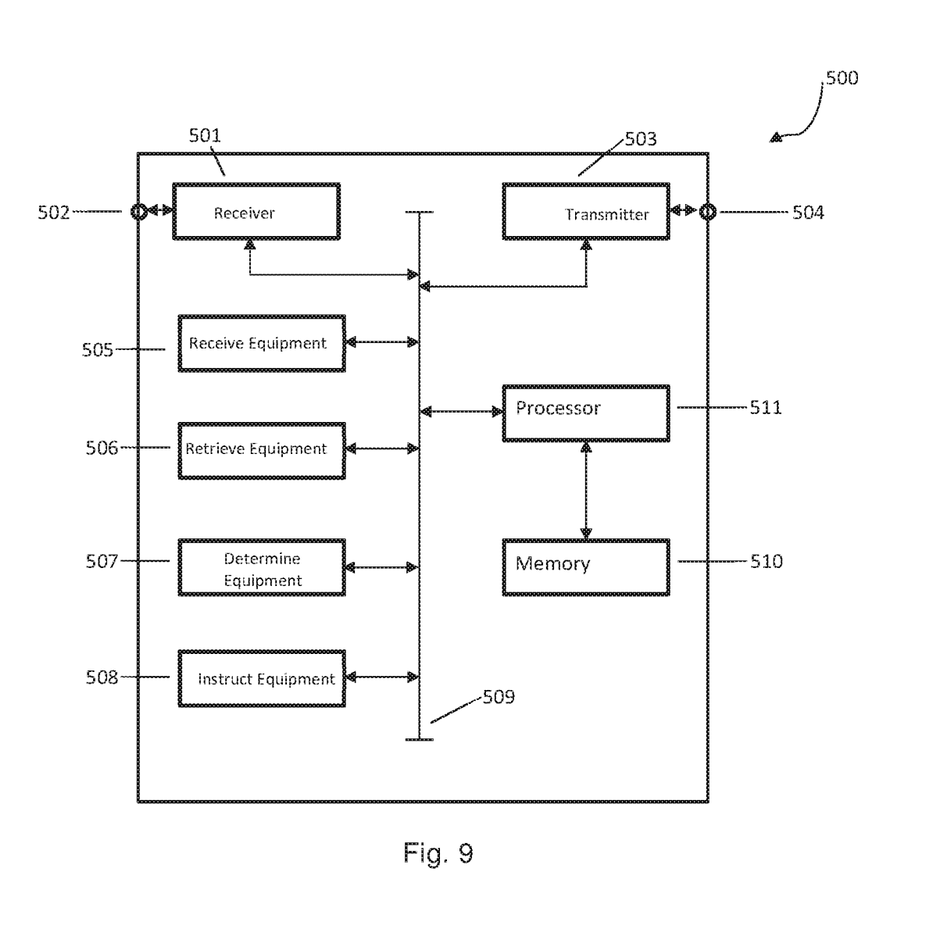
FIG. 9 is a schematic chart illustrating an example of a network element.

FIG. 9 is a schematic chart illustrating an example, 500, of a network element, for example a node, which is capable of instructing an UE to initiate a PDU session between the UE and one or more DNNs when a method according to one of the examples as mentioned earlier is implemented in it.

The example, 500, comprises receiver 501, 502, arranged for receiving communication signals within a telecommunication network. The present invention primarily concerns a 5GS telecommunication network, wherein functional components, referred to as service communicate with one another using messages. The receiver 501, 502 is therefore arranged to receive such messages. The receive equipment 505 is specifically arranged to receive and interpret a registration request from an UE in the telecommunication network. The retrieve equipment 506, is arranged for retrieving from a UDM node, a list of one or more DNNs, with which the UE is expected to establish a PDU session The retrieve equipment 506 may further comprise of transmit equipment that is arranged to transmit an update location request to the UDM, and a receive equipment that is arranged to specifically receive the update location response from the UDM. The update location response comprises of subscription data and a list of one or more DNNs with which the UE is expected to establish a PDU session. The network node 500 may optionally include a determine equipment 507, which is arranged for determining whether or not the UE has to establish a PDU session to all the DNNs retrieved by the retrieve equipment 506. The determine equipment 507, may further be arranged to receive additional inputs based on which a decision of instructing the UE to initiate a PDU connection can be made.

Additionally, the node 500 also comprises of an instruct equipment which generates an instruct signal thereby instructing the UE to initiate the PDU sessions with one or more DNNs.

The example, 500, comprises a processor, 511 and a memory, 510. All the equipment, 505-508, interact with one another and with the processor via a communication bus, 509. Transmit equipment 503 and 504 are also provided within the example in order to facilitate communication with external devices such as User Equipment, UE, or other network functions.

Figure 10:
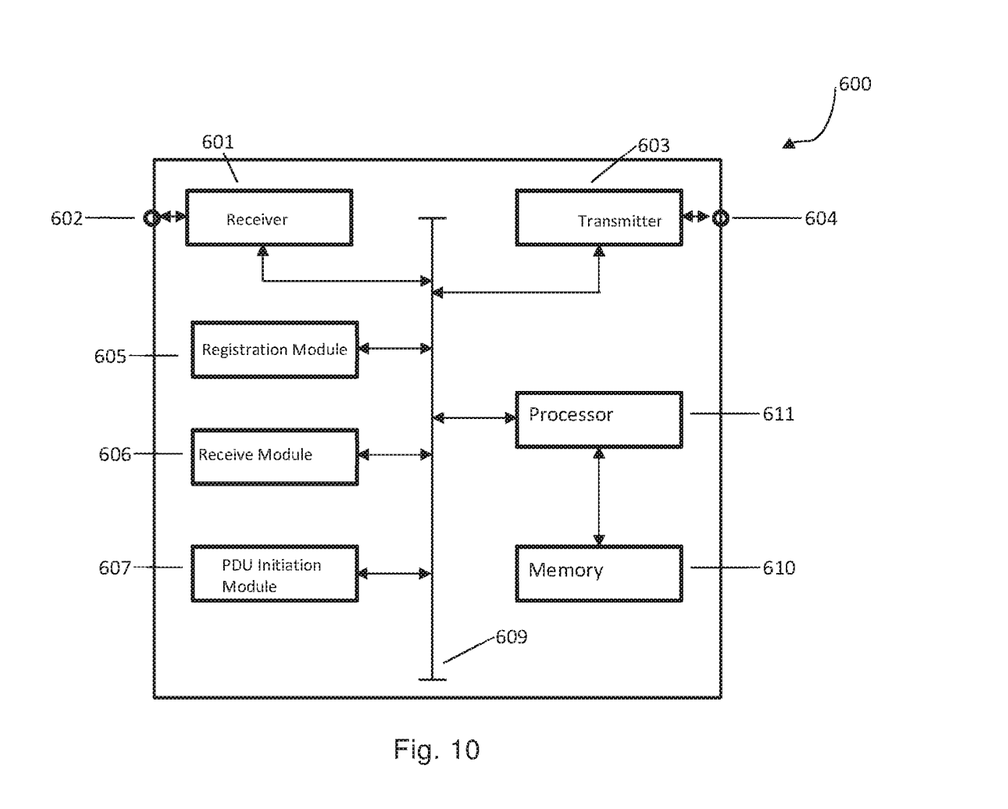
FIG. 10 is a schematic chart illustrating an example of a User Equipment.

FIG. 10 is a schematic chart illustrating an example, 600, of an User equipment, UE, which is capable of instructing a receiving an instruction from an AMF to initiate PDU sessions with one or more DNNs, when a method according to one of the above mentioned examples is executed on it. The example, 600, comprises receiver 601, 602, arranged for receiving communication signals within a telecommunication network.

The registration module 605 is arranged for sending a registration request to the AMF node and the UDM node. The receive module 606 is arranged for receiving a list of one or more DNNs from the AMF node. Subsequently, the PDU initiation module 607 is arranged for initiating PDU sessions with the received DNNs.

The example, 600, comprises a processor, 611 and a memory, 610. All the equipment, 605-607, interact with one another and with the processor 611 via a communication bus, 509. Transmit equipment 603 and 604 are also provided within the example in order to facilitate communication with external devices such as User Equipment, UE, or other network functions.

Other variations to the disclosed examples can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method of operation by an Access and Mobility Function (AMF) node in a telecommunication network, the method comprising:
   receiving a registration request for registering a User Equipment (UE) in the telecommunication network;
   retrieving subscription data associated with the UE from a Unified Data Management (UDM) node, responsive to authentication of the UE for registration in the telecommunication network, the subscription data indicating a Data Network (DN) to which the UE should establish a Packet Data Unit (PDU) session via the telecommunication network upon registration of the UE in the telecommunication network, the subscription data including a Data Network Name (DNN) identifying the DN; and
   triggering the UE to establish the PDU session with the DN by sending a registration complete message for the UE that confirms registration of the UE in the telecommunication network and conveys instructions instructing the UE to establish the PDU session with the DN.

2. The method of claim 1, wherein triggering the UE to establish the PDU session with the DN is conditional, in dependence on at least one of:
   determining from UE context information that the UE supports a communication service provided by the DN;
   evaluating dynamic network conditions relevant to providing a communication service offered by the DN to the UE; or
   evaluating policy information relevant to providing the communication service offered by the DN to the UE.

3. The method of claim 1, wherein the DN is a conditionally-selected one among one or more conditionally-selected DNs selected by the AMF from a list of DNs indicated in the subscription data as being DNs to which the UE should establish respective PDU sessions via the telecommunication network upon registration of the UE in the telecommunication network, each DN in the list being associated with a respective communication service, and wherein the method includes selecting the one or more conditionally-selected DNs from the list of DNs in dependence on evaluating one or more conditions bearing on providing the respective communication services to the UE.

4. The method of claim 3, further comprising, subsequent to sending the registration complete message and in a dependence on a change in the one or more conditions, selecting one or more further ones of the DNs from the list of DNs, and sending a further message to the UE, the further message including instructions triggering the UE to establish a PDU session with each further DN.

5. The method of claim 1, wherein the registration complete message includes, as the instructions, one or more information elements that indicate the DNN of the DN and indicate one or more types of PDU sessions to be established by the UE, the one or more types of PDU sessions at least including a session type associated with the DN.

6. The method of claim 1, wherein the DN is one among a list of DNs indicated in the subscription data as being DNs to which the UE should establish respective PDU sessions via the telecommunication network upon registration of the UE in the telecommunication network, each DN in the list being associated with a respective communication service having a corresponding session type, and wherein instructions indicate the DNNs corresponding to the list of DNs and indicate one or more PDU session types, such that registration complete message triggers the UE to establish PDU sessions with the DNs in the list of DNs for which the corresponding session type matches one of the indicated one or more PDU session types.

7. An Access and Mobility Function (AMF) node configured for operation in a telecommunication network, the AMF node comprising:
   communication circuitry configured for sending and receiving signaling in association with registering User Equipments (UEs) in the telecommunication network; and
   processing circuitry operatively associated with the communication circuitry and configured to:
   receive a registration request for registering a UE in the telecommunication network;
   retrieve subscription data associated with the UE from a Unified Data Management (UDM) node, responsive to authentication of the UE for registration in the telecommunication network, the subscription data indicating a Data Network (DN) to which the UE should establish a Packet Data Unit (PDU) session via the telecommunication network upon registration of the UE in the telecommunication network, the subscription data including a Data Network Name (DNN) identifying the DN; and
   trigger the UE to establish the PDU session with the DN by sending a registration complete message for the UE that confirms registration of the UE in the telecommunication network and conveys instructions instructing the UE to establish the PDU session with the DN.

8. The AMF node of claim 7, wherein the processing circuitry is configured to trigger the UE to establish the PDU session with the DN on a conditional basis, in dependence on at least one of:

determining from UE context information that the UE supports a communication service provided by the DN;
evaluating dynamic network conditions relevant to providing a communication service offered by the DN to the UE; or
evaluating policy information relevant to providing the communication service offered by the DN to the UE.

9. The AMF node of claim 7, wherein the DN is a conditionally-selected one among one or more conditionally-selected DNs selected by the processing circuitry from a list of DNs indicated in the subscription data as being DNs to which the UE should establish respective PDU sessions via the telecommunication network upon registration of the UE in the telecommunication network, each DN in the list being associated with a respective communication service, and wherein the processing circuitry is configured to select the one or more conditionally-selected DNs from the list of DNs in dependence on evaluating one or more conditions bearing on providing the respective communication services to the UE.

10. The AMF node of claim 9, wherein the processing circuitry is configured to select one or more further ones of the DNs from the list of DNs, subsequent to sending the registration complete message and in a dependence on a change in the one or more conditions, and send a further message to the UE, the further message including instructions triggering the UE to establish a PDU session with each further DN.

11. The AMF node of claim 7, wherein the registration complete message includes one or more information elements as the instructions, the one or more information elements indicating one or more types of PDU sessions to be established by the UE, the one or more types of PDU sessions at least including a session type associated with the DN.

12. The AMF node of claim 7, wherein the DN is one among a list of DNs indicated in the subscription data as being DNs to which the UE should establish respective PDU sessions via the telecommunication network upon registration of the UE in the telecommunication network, each DN in the list being associated with a respective communication service having a corresponding session type, and wherein the instructions indicate the DNNs corresponding to the list of DNs and indicate one or more PDU session types, such that registration complete message triggers the UE to establish PDU sessions with the DNs in the list of DNs for which the corresponding session type matches one of the indicated one or more PDU session types.

13. A method of operation by a User Equipment (UE) configured for operation in a telecommunication network, the method comprising:
   sending a registration request to an Access and Mobility Function (AMF) in the telecommunication network, for registering the UE in the telecommunication network;
   receiving registration complete message from the AMF, indicating completion of registration and conveying instructions instructing the UE to establish a Packet Data Unit (PDU) session with an identified Data Network (DN); and
   initiating establishment of the PDU session to the identified DN, in response to the instructions conveyed in the registration complete message.

14. A User Equipment (UE) configured for operation in a telecommunication network, the UE comprising:
   communication circuitry configured for communicating with one or more nodes in the telecommunication network, based on sending signals to and receiving signals from a Radio Access Network (RAN) portion of the telecommunication network; and processing circuitry operatively associated with the communication circuitry and configured to:
- send a registration request to an Access and Mobility Function (AMF) in the telecommunication network, for registering the UE in the telecommunication network;
- receive registration complete message from the AMF, indicating completion of registration and conveying instructions instructing the UE to establish a Packet Data Unit (PDU) session with an identified Data Network (DN); and
- initiate establishment of the PDU session with the identified DN, in response to the instructions conveyed in the registration complete message.

15. A method of operation by an Access and Mobility Function (AMF) node in a telecommunication network, the method comprising:

receiving a registration request for registering a User Equipment (UE) in the telecommunication network;

retrieving subscription data associated with the UE from a Unified Data Management (UDM) node, responsive to authentication of the UE for registration in the telecommunication network, the subscription data identifying one or more Data Networks (DNs), as identified DNs;

deciding whether to trigger Packet Data Unit (PDU) session establishment by the UE towards any of the identified DNs, in conjunction with indicating completion of registration of the UE; and responsive to an affirmative decision, including instructions in a registration complete message sent from the AMF towards the UE, the instructions triggering the UE to establish a PDU session towards at least one of the identified DNs.

* * * * *